UNITED STATES PATENT OFFICE.

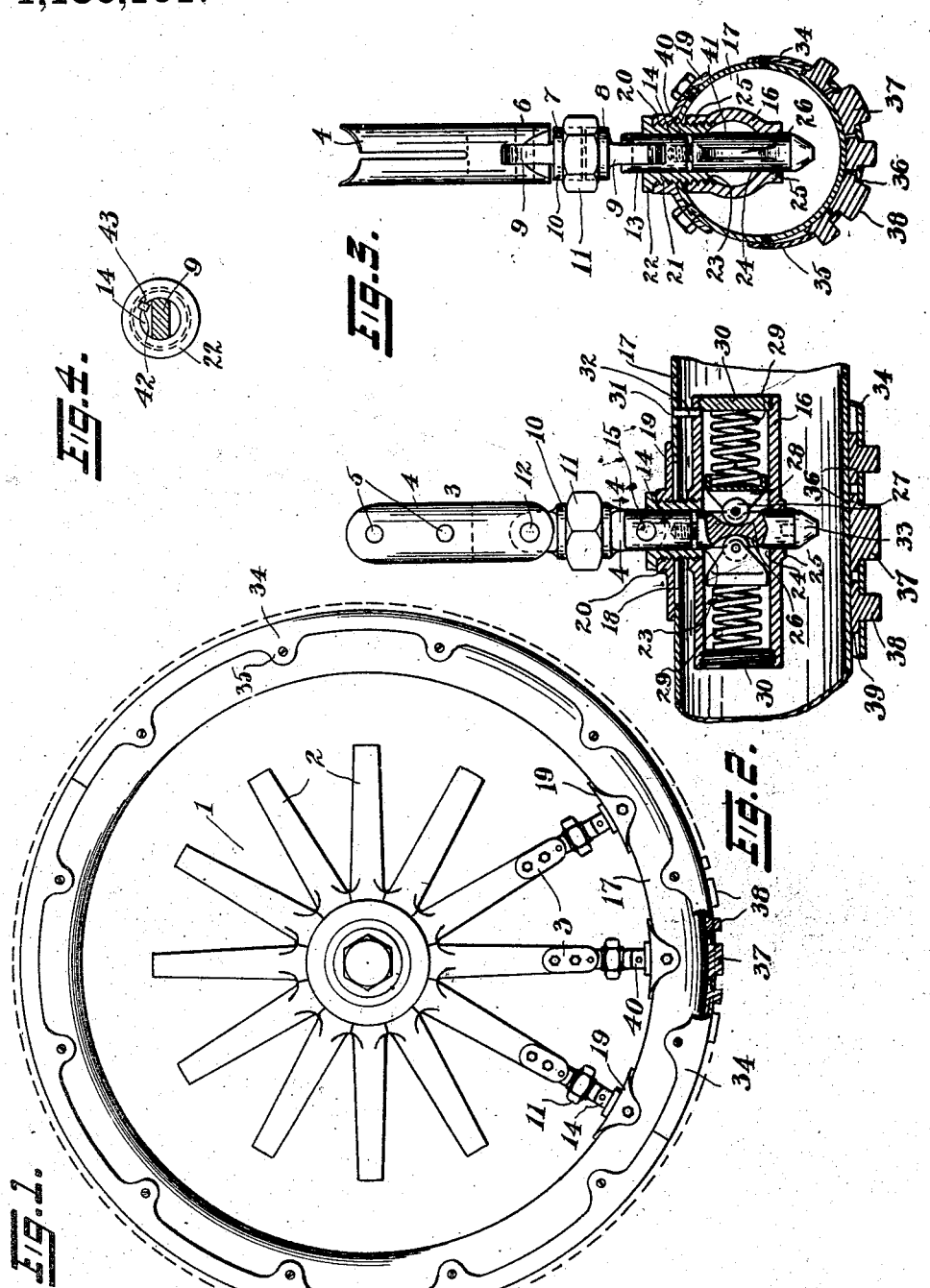

FRANK E. ANDERSON, OF BROOKLYN, NEW YORK, ASSIGNOR OF ONE-THIRD TO GEORGE A. FRIEDRICH AND ONE-THIRD TO GEORGE W. DARLING, BOTH OF NEW YORK, N. Y.

VEHICLE-WHEEL.

1,180,101.   Specification of Letters Patent.   Patented Apr. 18, 1916.

Application filed October 7, 1914. Serial No. 865,421.

*To all whom it may concern:*

Be it known that I, FRANK E. ANDERSON, a subject of the King of England, residing in Brooklyn, in the county of Kings and State of New York, have invented certain new and useful Improvements in Vehicle-Wheels, of which the following is a specification.

This invention relates to vehicle wheels especially adapted for use on automobiles.

The main object of the invention is to provide a vehicle wheel possessing the required resiliency for taking up jolts and jars and which is not beset with the disadvantages of a pneumatic tire due to the liability of punctures and the like.

Another object of the invention is to provide an arrangement which can be equipped on any of the standard wheels now on the market, in order to convert them into resilient vehicle wheels.

Still another object of the invention is to provide such a resilient wheel arrangement which is simple in construction, composed of substantial parts that are conducive to the long life of the article, the working parts of which are inclosed so as to be protected from dust and such like foreign material, and which arrangement can be manufactured at comparatively low cost.

These and other features, capabilities and advantages of the invention will appear from the subjoined detailed description of one specific embodiment thereof illustrated in the accompanying drawings in which—

Figure 1 is a side elevation of a wheel in which several of the spokes are equipped with the arrangement forming the main part of the present invention. Figs. 2 and 3 are enlarged side and end views respectively, partly in cross section of one member of the cushioning means. Fig. 4 is a section on the line 4—4 of Fig. 2.

In the embodiment shown, there is provided a wheel portion 1 having short spokes 2 which wheel portion may be of any suitable construction and if desired a wheel of standard construction may be used after cutting off the outer ends of its spokes. To these spokes 2, cushioning members are secured each of which comprises two sections, an inner section 3 having one end formed into a ferrule 4 provided with openings 5 through which securing means may be passed to secure the section to a spoke. The other end of the section 3 is formed into a bifurcated end 6 to which a hinge member is secured. The hinge member comprises two like pivot portions 7 and 8, each having a diminished portion 9 and a head portion 10 having a smooth outer end which may contact with and abut against the smooth outer end of the other pivot portion, and each pivot portion having on its lateral side a screw threaded conformation to receive the nut 11 whereby the two pivot portions 7 and 8 are secured to one another.

Through the bifurcated end 6 and the diminished portion 10 of the pivot portion 7, there is provided a pin opening to receive the pivot pin 12, and through the bifurcated end 13 of the other section 14 of the cushioning member and the diminished portion 9 of the pivot portion 8, there is provided a pin opening to receive the pin 15. The section 14 is a plunger member and coöperates in a housing 16, disposed in the tubular member 17. There is provided such a housing 16 for each of the plunger sections 14.

In the inner periphery of the tubular member 17 and adjacent to the housing 16 there is disposed an opening 18 through which the housing member is passed into the tubular member 17. After the housing member has been secured in place, a cap member 19 is fixed over the opening 18. The cap member 19 is provided with an opening around which is formed a boss 20, to receive the collar 21 having screw threaded connection with said cap member and having a flange 22 to rest on the boss 20. The housing 16 is preferably cylindrical in conformation and provided with diametrically opposed openings 23 and 24 around which on the outer wall of the housing 16 are formed bosses 25, 25, the upper boss 25 having a screw threaded connection with the inwardly extending portion of the collar 21. The plunger section 14 passes through the collar 21 and extends through the housing 16, projecting out of the other opening 25 of such housing. The plunger section 14 comprises an upper portion 40 and a lower portion 41. The upper portion is preferably composed of some metal other than that of which the collar 21 is composed in which collar 21 the upper portion rides for the purpose of reducing the friction between said collar and upper portion and for forming a close working fit, and in the outer periphery of said upper portion there is provided a longitudinal slot 42 to engage the pin 43 formed on the collar 21 whereby the plunger section 14 is guided. The lower portion 41 is the portion of the section 14 which projects out through said opening 25, and on each of its oppositely disposed sides is provided a cam recess 26, in which cam recesses ride the rollers 27 pivotally mounted in brackets 28, having seats to receive compression springs 29 which are strained between such brackets and disks 30 secured in the ends of the housing 16.

To position the housings 16 in said tubular member, the tubular member is provided with recesses 31 disposed adjacent to the openings 18, and the housings 16 are provided with pins 32 which are adapted to seat in said recesses.

The lower end of the plunger section 14 is provided with a rubber stud 33 properly secured in place which stud serves as a buffer to strike the inner wall of the tubular member 17 when the plunger section is depressed.

The operation of the foregoing portion of this device is as follows: When the wheel is jolted or jarred, the spoke adjacent to the road-bed, when such jar occurs, will depress into the tubular member with the stud 33 approaching the inner wall of the tubular member 17, while the rollers 27 ride up the cam surfaces 26; the other spokes will have a similar movement but varying in extent, those spokes below the diameter of the wheel dividing the lower from the upper half of the wheel, having a movement gradually decreasing in the distance they descend, as they approach an imaginary line forming the aforesaid diameter of such wheel, while the spokes above such imaginary line will be drawn out of the tubular member 17 gradually increasing in such outer movement as the distance increases between them and the aforesaid lower spoke, the maximum outer movement being transmitted to the spoke disposed diametrically opposite to the spoke adjacent to the road-bed. Simultaneously with the aforesaid movement of the plungers into and out of the tubular member, the several cushioning members between the lowermost spoke and the topmost spoke will have their hinge members operated, each hinge action increasing in extent of movement as the distance increases between them and the topmost and lowermost spokes, those spokes, which are nearest to or approximately at the imaginary diametrical line dividing the upper from the lower half of the wheel, performing the greatest hinge movement.

On the outside of the tubular member, there is provided a metal band 34 which extends around the entire outer periphery of the tubular member 17, being curvilinear in cross section and having ears 35 formed along its lateral sides by means of which the metal band 34 is secured to the tubular member 17. In the tread portion of the metal band 34, there are provided a series of elongated openings 36, some running parallel with the peripheral line around the tubular member and the others extending transversely thereto, in which openings, rubber blocks 37 are secured, such rubber blocks each having a diminished road-engaging portion 38 and an enlarged head conformation 39, the road-engaging portions 38 extending through the openings 36, while the head conformations are clamped between the tubular member 17 and the metal band 34.

It is obvious that various changes and modifications may be made to the details of construction without departing from the general scope of the invention.

I claim:

1. In combination with the spokes of a vehicle wheel, of an attachment having a series of cushioning members, a continuous tubular member secured to said cushioning members, said cushioning members each comprising two sections, a hinge member pivotally connecting said two sections to one another, one section of each of said cushioning members being secured to a spoke, and coil springs disposed longitudinally in said tubular member and engaging the other sections of said cushioning members on opposite sides for securing the same in place.

2. In combination with a continuous tubular member, of cushioning members for a vehicle wheel, there being openings in said tubular member through which said cushioning members extend, cams for normally maintaining said cushioning members in initial position transversely of said tubular member, and resilient means disposed longitudinally in said tubular member for resiliently maintaining said cams in contact with said cushioning members.

3. In combination with a continuous tubular member, of cushioning members for a vehicle wheel, there being openings in said tubular member through which said cushioning members extend, there being cam recesses in the sides of said cushioning members, means coöperating with said cam recesses to normally maintain said cushioning members in initial position transversely of said tubular member, and resilient means disposed longitudinally in said tubular member for resiliently maintaining said means in contact with said cam recesses.

4. In combination with a continuous tubular member, a cushioning member for a vehicle wheel, there being an opening in said tubular member through which said cushioning member extends, an elongated housing disposed longitudinally in said tubular member below said opening, said housing having diametrically opposed openings through which said cushioning member extends, and resilient means strained between each of the ends of said housing and said cushioning member to maintain said cushioning member in place.

5. In combination with a continuous tubular member, a cushioning member for a vehicle wheel, there being an opening in said tubular member through which said cushioning member extends, an elongated housing disposed longitudinally in said tubular member below said opening, said housing having diametrically opposed openings through which said cushioning member extends, there being cam recesses in said cushioning member disposed opposite each of the ends of said housing, and resilient means strained between each of the ends of said housing and said cushioning member and engaging in said recesses to maintain said cushioning member in place.

6. In combination with a continuous tubular member, a cushioning member for a vehicle wheel, there being an opening in said tubular member through which said cushioning member extends, an elongated housing disposed longitudinally in said tubular member below said opening, said housing having diametrically opposed openings through which said cushioning member extends, and resilient means strained between each of the ends of said housing and said cushioning member to maintain said cushioning member in place, and a yieldable member secured to the inner free end of said cushioning member and adapted to strike the inner wall of said tubular member when said cushioning member is depressed into said tubular member.

7. In combination with a continuous tubular member, a cushioning member for a vehicle wheel, there being an opening in said tubular member through which said cushioning member extends, an elongated housing disposed longitudinally in said tubular member below said opening, said housing having diametrically opposed openings through which said cushioning member extends, there being cam recesses in said cushioning member disposed opposite each of the ends of said housing, rollers engaging in said cam recesses, and resilient means strained between each of the ends of said housing and said rollers to maintain said cushioning member in place.

8. In combination with a continuous tubular member, a cushioning member for a vehicle wheel, there being an opening in said tubular member through which said cushioning member extends, an elongated housing disposed longitudinally in said tubular member below said opening, said housing having diametrically opposed openings through which said cushioning member extends, a pin on said housing member and there being a recess in the inner wall of said tubular wall in which said pin engages and thereby positions the housing in said tubular member, there also being cam recesses in said cushioning member disposed opposite each of the ends of said housing, rollers engaging in said cam recesses, and resilient means strained between each of the ends of said housing and said rollers to maintain said cushioning member in place.

9. In combination with a continuous tubular member, a cushioning member for a vehicle wheel, there being an opening in said tubular member through which said cushioning member extends, an elongated housing disposed longitudinally in said tubular member below said opening, a cap member disposed over said opening, a collar extending therethrough and connecting at its lower end with the housing to anchor the same in place, said housing having diametrically opposed openings, the cushioning member extending through said collar and through the diametrically opposed openings of the housing, and resilient means strained between each of the ends of said housing and said cushioning member to maintain said cushioning member in place.

10. In combination with a continuous tubular member, a cushioning member for a vehicle wheel, there being an opening in said tubular member through which said cushioning member extends, said cushioning member comprising two sections, and a hinge member connecting said sections to one another, one section being provided with a ferrule to engage the end of a spoke and be secured thereto, the other section forming a plunger and being the portion which extends into the tubular member, there being cam surfaces in the sides of said plunger section, and resilient means engaging in said cam recesses and thereby normally maintaining said cushioning member in place.

11. In combination with a continuous tubular member, a cushioning member for a vehicle wheel, there being an opening in said tubular member through which said cushioning member extends, a cap member disposed over said opening, a collar extending therethrough, said cushioning member comprising two sections, and a hinge member connecting said sections to one another, one section being provided with securing means to engage the end of a spoke of said wheel and being secured thereto, the other section forming a plunger and being the portion which extends into said tubular member, and a lower portion having a screw threaded connection with said upper portion, there being cam surfaces in opposite sides of said lower portion, and coil springs disposed longitudinally in said tubular member and engaging in said cam recesses and thereby normally maintaining said cushioning member in place.

12. In combination with a continuous tubular member, a cushioning member for a vehicle wheel, there being an opening in said tubular member through which said cushioning member extends, a cap member disposed over said opening, a collar extending therethrough, a guiding pin positioned on the inner periphery of said collar, said cushioning member comprising two sections, and a hinge member connecting said sections to one another, one section being provided with securing means to engage the end of a spoke of said wheel and being secured thereto, the other section forming a plunger and extending through said collar into said tubular member, said other section having an upper portion provided with a longitudinal slot to engage said pin whereby said plunger is guided, and a lower portion having screw threaded connection with said upper portion, there being cam surfaces in the opposite sides of said lower portion, and coil springs disposed longitudinally in said tubular member and engaging in said cam recesses and thereby normally maintaining said cushioning member in place.

FRANK E. ANDERSON.

Witnesses:
GUSTAV DREWS,
J. F. V. CHRISTOPHER.